(No Model.)
E. J. LEYBURN.
Truck.
No. 234,486. Patented Nov. 16, 1880.
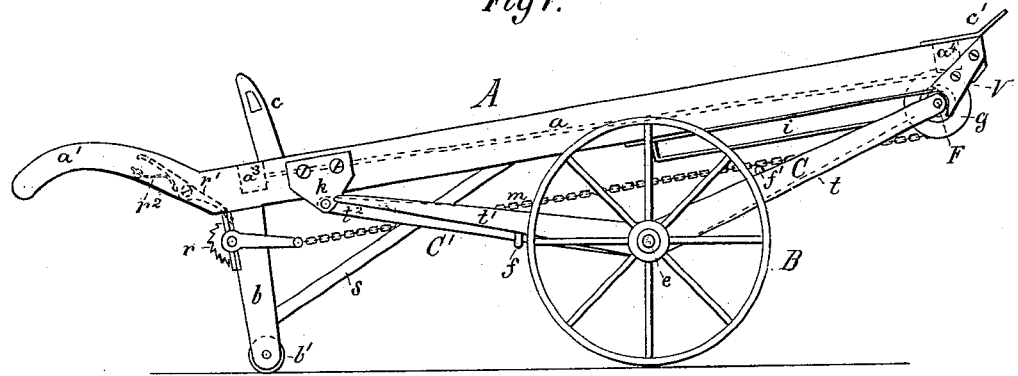
Fig 1.
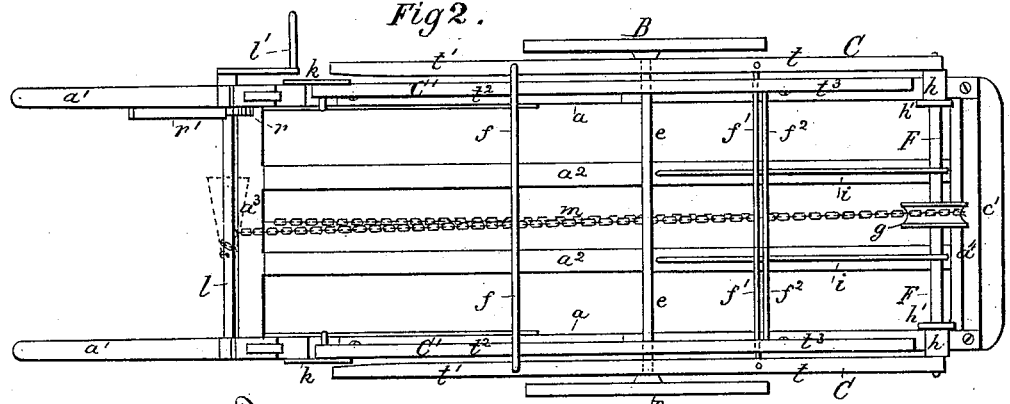
Fig 2.
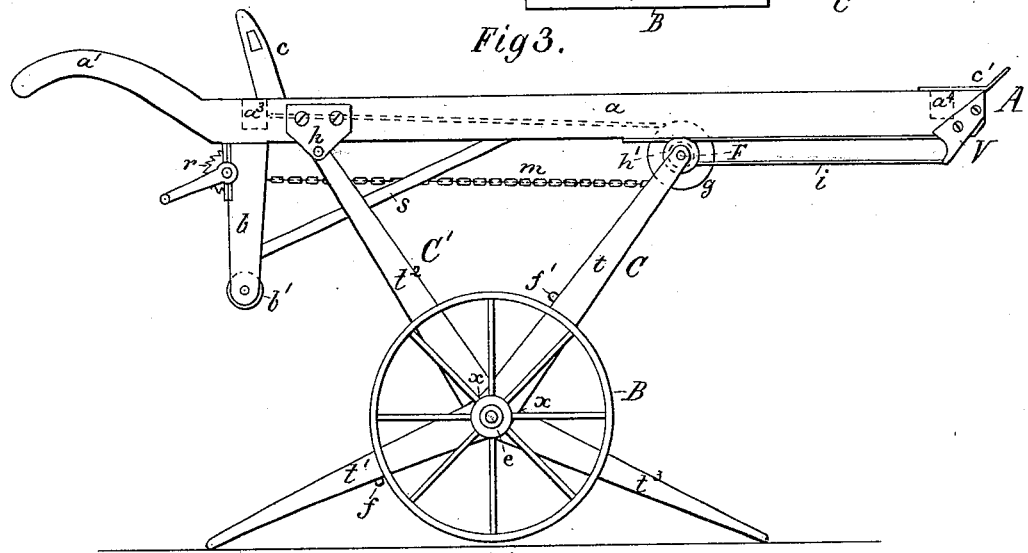
Fig 3.
Fig 4.
Witnesses:
J. P. Th. Lang.
J. Russell Bart
Inventor:
Edward J. Leyburn
by
Mason Fenwick & Lawrence
his attys.

UNITED STATES PATENT OFFICE.

EDWARD J. LEYBURN, OF FREDERICKSBURG, VIRGINIA.

TRUCK.

SPECIFICATION forming part of Letters Patent No. 234,486, dated November 16, 1880.

Application filed May 5, 1880. (No model.)

*To all whom it may concern:*

Be it known that I, EDWARD J. LEYBURN, a citizen of the United States, residing at Fredericksburg, in the county of Spottsylvania and State of Virginia, have invented a new and Improved Truck for loading trunks upon railroad-cars, and for carrying articles to be dumped, and for hospital purposes; and I do hereby declare that the following is a full, clear, and exact description thereof, reference being had to the annexed drawings and the letters of reference marked thereon, forming a part of this specification, in which drawings—

Figure 1 is a side elevation of my improved truck, showing its normal position when closed and not in use. Fig. 2 is a plan view of my improved truck, the truck being turned upside down. Fig. 3 is a side elevation, showing the platform of the truck elevated and as it will appear when the truck is run alongside of a railroad-car ready to receive baggage therefrom or deliver trunks or baggage thereto, the wheels of the truck being raised out of contact with the floor upon which the truck stands, and the platform steadily supported upon legs which are independent of the wheels. Fig. 4 is a modification of the supporting-legs of the truck, the legs being made straight instead of being bent, as shown in Figs. 1 and 3, and with a bracket applied to the under side of the straight legs, thus admitting of the utilization of straight legs instead of bent, and which brackets will also serve as a central brace-support for the truck when closed or shut down.

The main object of my invention is the production of a truck which shall deliver its load at the side of a car and entirely independent of the car for its support, and which shall be able to stand up alone and be self-supporting when fully raised either for the delivery of a load from its platform or the reception of a load thereon.

In the drawings, A indicates the platform or load-bed of my improved truck, and is composed of longitudinal side pieces, $a$, which at one end terminate in handles $a'$, and of longitudinal intermediate pieces, $a^2$, and cross-pieces $a^3$ $a^4$, the whole of said pieces being framed together, as indicated in the drawings, in any suitable manner. Short supporting-legs $b$, having rollers, as at $b'$, are applied to the longitudinal side pieces, $a$, as shown. At the rear end of the truck a guard, $c$, is framed into and crosswise of the platform, while at its forward end a metal plate, $c'$, as is usual in trucks, is provided.

B B are the supporting-wheels of the truck, and upon which the truck is wheeled from place to place, either when the platform A is shut down, as in Fig. 1, or before it is fully elevated, as in Fig. 3. These wheels are loosely applied upon an axle, $e$, which extends from wheel to wheel at the outside of the truck, as shown.

C C are two outer supporting-legs, and C' C' two inner supporting-legs, on each side of the truck, which afford a firm support for the platform A, and independent of the wheels B B, when said legs are thrown out of their position shown in Fig. 1 and into the position shown in Fig. 3, thereby elevating the platform A from its position shown in Fig. 1 to that shown in Fig. 3. Each of these supporting-legs are, at a point about central of their length, so bent as to form an obtuse angle at $x$, and at such bent portion the axle $e$ is made to pass through each of said legs, the latter having an articulation upon the axle during the act of elevating the platform A, and a full bearing upon the axle when the platform is in the position shown in Fig. 3. The legs C C', I intend to construct with a more or less bend and of greater or less length, according to the height the platform A is to be raised when the truck is in use, and instead of bending them so as to form an obtuse angle at a point midway, or thereabout, of their length, they may be made bowing or in curved form; but instead of being made either bent or bowing they may be made straight, as signified at C in Fig. 4, in which case they will each be provided with a bracket, D, suitably constructed to articulate upon the axle of the truck, as shown in solid lines in said Fig. 4.

The outer supporting-legs, C, on either side of the truck are at one end pivotally connected with a transverse shaft, F. (Clearly shown in Fig. 2.) This shaft is provided with a chain-wheel, $g$, central of its length, and with rollers $h$ near its ends, the wheel and rollers being made fast to the shaft.

Guide-rods $i$ $i$ have their ends driven into the under side of the longitudinal pieces $a^2$, so as to confine the shaft F above said rods, and at the same time compel the periphery of the rollers $h$ to impinge against the under side of the longitudinal pieces $a^2$ during the act of elevating the platform A, said shaft during such act being made to travel from its position shown in Figs. 1 and 2 to its position as shown in Fig. 3. As the rollers $h$ on shaft F are provided with circular flanges $h'$, which project above the under surface of the pieces $a^2$, as shown, the rollers $h$ are always kept in their proper track during the movements of the shaft F.

The inner supporting-legs, $C'$, at each side of the truck are at one end pivotally connected to a metal plate, $k$, which is securely fixed to the longitudinal pieces $a$, as indicated in Figs. 1, 2, and 3.

At the rear end of the truck a crank-shaft, $l$, with handle $l'$, is secured in a proper manner to the short legs $b$, as shown, and a chain, $m$, having one end fastened to the shaft $l$, is passed forward around the chain-wheel $g$, and thence back to the cross-piece $a^3$, to which latter the chain is securely fastened.

At one end of the shaft $l$ a ratchet-wheel, $r$, is applied, which revolves with the shaft $l$, while a pawl, $r'$, attached to the inside surface of one of the handles $a'$, as shown, is caused to properly engage with the teeth of the ratchet-wheel $r$ by means of a spring, $r^2$, and while the shaft $l$ is rotated by the handle $l'$ in a direction to wind the chain upon the shaft the pawl will slide over the teeth of the ratchet-wheel; but on such movement ceasing the pawl instantly engages with the teeth of the ratchet-wheel, thereby preventing a back movement of the ratchet-wheel and shaft $l$, and holding the platform A in the position to which it may have been elevated by the rotation of said shaft.

Supposing the truck to be in the position shown in Fig. 1, by rotating the shaft $l$, as just described, the chain may be wound up thereon, thereby rotating the chain-wheel $g$ and shaft F, at the same time drawing the shaft F along upon the guide-rods $i$ from the front end of the truck, as shown in Figs. 1 and 2, until the further movement of the shaft F is arrested by striking against the rear ends of the guide-rods $i$, at which moment the truck will have assumed the position shown in Fig. 3. As one end of each of the supporting-legs C is pivoted to the shaft F, the moment said shaft commences its movement rearwardly of the truck the forward limbs, $t$, of said legs simultaneously become raised, while their rear limbs or free portions, $t'$, become correspondingly depressed and the platform A correspondingly elevated; and as one end of each of the legs $C'$ is pivoted at $k$ to the platform the elevation of the latter correspondingly elevates the rear limbs, $t^2$, of the legs $C'$, and at the same time depresses their forward limbs or free portions, $t^3$, until finally said limbs $t'$ and $t^3$ of the legs C C' come in contact with the floor upon which the truck is used, and so form a firm support for the platform (and any load thereon) independent of the wheels B B, as signified in Fig. 3, after which, if the pawl $r'$ be released from the ratchet-wheel $r$, the truck will automatically resume its original position with the legs C C' folded up, as in Fig. 1.

It will thus be seen that in the construction of my improved truck I utilize supporting legs or bars of a length sufficient to elevate the platform of the truck to the height desired, said legs or bars being connected to the platform at one of their ends, while their other ends are capable of being depressed, so as to form a firm support for the platform and any load thereon, and this either in conjunction with or without any support of the main wheels of the truck or the operator of the truck. In other words, when my improved truck is caused to assume the position shown in Fig. 3 it can stand alone and is self-supporting.

The outer supporting-legs, C, I connect together by a bar, $f$, one end of this bar being connected with the under side of the limb $t'$ of the leg C on one side of the truck and its opposite end with the under side of the limb $t'$ of the corresponding leg C on the other side of the truck. Another cross-bar, $f'$, is made to connect the forward limbs, $t$, of said legs C C, this bar being attached to said limbs on the top edge or surface thereof, and thus said bars serve to limit the "throw" of the respective legs C and C, C' and C', in the act of their being folded together into the position shown in Figs. 1 and 2. I also apply cross-bars $f^2$ between the respective limbs $t^2$ and $t^3$ of the legs C' C'; but these bars (one of which is not shown in the drawings) act merely as stays for the legs C' C'.

Braces $s$ connect the short legs $b$ with the longitudinal side pieces, $a$, of the platform A, and at the forward end of said longitudinal pieces $a$, I apply bumpers, formed as at $v$, against which the extreme ends of the forward limbs, $t$, of the legs C C strike when the legs C C are changed from their position shown in Fig. 3 to their position shown in Fig. 1. The curved face of these bumpers may be lined with rubber, and thus better adapt them to receive the shock of the legs C C.

To save time in winding up the chain or rope $m$, and consequently the elevating of the platform A, that portion of the shaft $l$ upon which the chain is wound may be made cone-shaped, as indicated in dotted lines in Fig. 2, and when heavy lifting is to be done gearing may be employed between a hand crank-shaft and the shaft upon which the chain $m$ is wound up in the act of elevating the platform.

The position of the truck as shown in Fig. 1 may be reversely changed by tilting down its forward end, and thus be in proper position for receiving a flour-barrel or box upon the forward end of the platform.

For use in hospitals the truck can be made lighter than for heavy work, and as it can be rolled up at the side of a bed or cot with either a bed or stretcher upon it, and is easily raised or lowered and held in any desired position, and can be tilted forward or backward to suit the patient, its adaptability for such use is manifest.

A brake to prevent the sudden descent of the platform may be applied to the shaft $l$, if desired.

I claim—

1. A truck provided with supporting-legs one end of which are connected with the platform of the truck, and with their outer ends free, so that when the platform is fully elevated the free ends of the legs will be depressed into a position whereby said legs will constitute a firm support for the platform and the truck become self-supporting, substantially as described.

2. The combination of supporting-legs C C, having limbs $t'$, supporting-legs C' C', having limbs $t^3$, platform A, axle $e$, and wheels B B, substantially as and for the purpose described.

3. The combination of the shaft F, provided with chain-wheel $g$ and flanged roller $h$, guide-rods $i\ i$, chain $m$, and ratchet-shaft $l$, substantially as and for the purpose described.

4. The combination of the platform A with supporting-legs C C, which have their forward limbs, $t$, connected with the forward end of the platform of the truck, and with supporting-legs C' C', which have their rear limbs, $t^2$, connected with the rear end of the platform of the truck, and each of said legs connected with the axle $e$ of the truck, substantially as described.

Signed in presence of two subscribing witnesses.

EDWARD J. LEYBURN.

Witnesses:
WM. CARUTHERS,
W. S. SCOTT.